(12) United States Patent
Zukouski

(10) Patent No.: US 9,429,095 B2
(45) Date of Patent: Aug. 30, 2016

(54) SYSTEM AND METHOD OF CONTROLLING FUEL INJECTION DROPLET SIZE IN AN ENGINE HAVING AN IN CYLINDER PRESSURE

(75) Inventor: Russell P. Zukouski, Bolingbrook, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 105 days.

(21) Appl. No.: 14/407,356

(22) PCT Filed: Jun. 11, 2012

(86) PCT No.: PCT/US2012/041820
§ 371 (c)(1),
(2), (4) Date: Dec. 11, 2014

(87) PCT Pub. No.: WO2013/187857
PCT Pub. Date: Dec. 19, 2013

(65) Prior Publication Data
US 2015/0167577 A1    Jun. 18, 2015

(51) Int. Cl.
| | | |
|---|---|---|
| F02M 7/28 | (2006.01) |
| F02D 41/30 | (2006.01) |
| F02D 41/40 | (2006.01) |
| F02D 35/02 | (2006.01) |
| F02D 15/00 | (2006.01) |
| F02D 41/18 | (2006.01) |
| F02D 41/14 | (2006.01) |
| F02B 29/04 | (2006.01) |
| F02M 45/12 | (2006.01) |
| F02B 37/00 | (2006.01) |
| F02B 37/013 | (2006.01) |
| F02M 61/18 | (2006.01) |

(52) U.S. Cl.
CPC ............... *F02D 41/30* (2013.01); *F02D 15/00* (2013.01); *F02D 35/023* (2013.01); *F02D 41/1438* (2013.01); *F02D 41/18* (2013.01); *F02D 41/40* (2013.01); *F02B 29/0406* (2013.01); *F02B 37/004* (2013.01); *F02B 37/013* (2013.01); *F02D 41/1456* (2013.01); *F02M 45/12* (2013.01); *F02M 61/182* (2013.01); *Y02T 10/44* (2013.01)

(58) Field of Classification Search
CPC ...... F02D 15/00; F02D 35/023; F02D 41/40; F02D 41/1456; Y02T 10/44; F02M 45/12; F02M 61/182; F02B 37/004; F02B 37/013; F02B 29/0406
USPC ...................... 123/435; 239/533.12
See application file for complete search history.

(56) References Cited

U.S. PATENT DOCUMENTS

| | | | | |
|---|---|---|---|---|
| 5,027,778 A | * | 7/1991 | Nogi ....................... F02D 43/00 123/472 |
| 6,935,304 B1 | | 8/2005 | Liu | |
| 6,990,934 B2 | * | 1/2006 | Sugiyama ............. F02B 75/048 123/48 B |
| 2015/0122223 A1 | * | 5/2015 | Zukouski ............ F02D 41/3836 123/435 |

* cited by examiner

*Primary Examiner* — Hai Huynh
(74) *Attorney, Agent, or Firm* — Jack D. Nimz; Jeffrey P. Calfa

(57) ABSTRACT

A method of operating an internal combustion engine is provided. An air/fuel ratio of the internal combustion engine is determined. At least one of a fuel injection quantity and an intake air flow is adjusted to provide an air/fuel ratio between about 15 and about 18. A compression ratio within a cylinder of the engine is determined. Droplet size of fuel provided by a fuel injector is adjusted based upon the compression ratio determined within the cylinder of the engine.

4 Claims, 2 Drawing Sheets

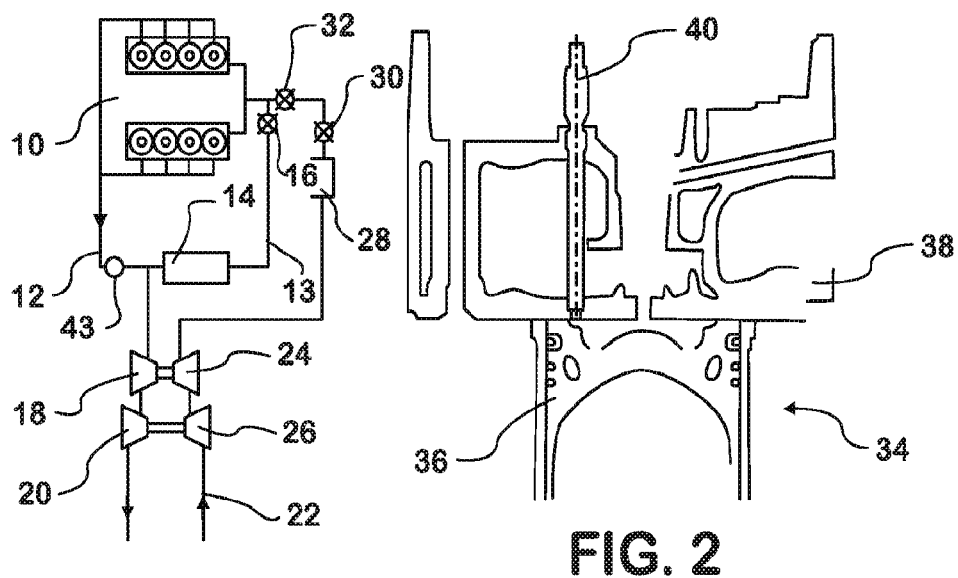
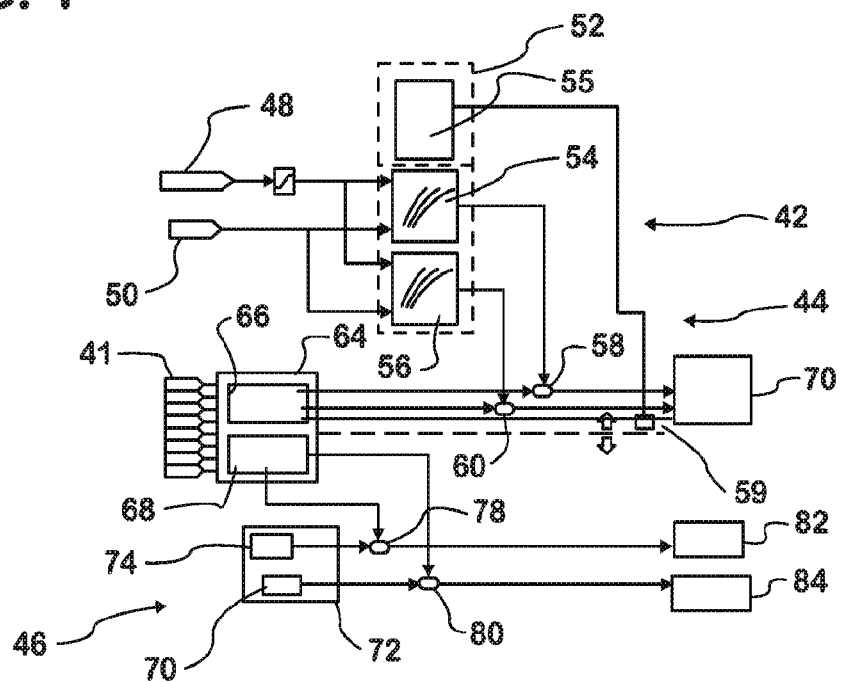

SYSTEM AND METHOD OF CONTROLLING FUEL INJECTION DROPLET SIZE IN AN ENGINE HAVING AN IN CYLINDER PRESSURE

TECHNICAL FIELD

The present disclosure relates to a system and method of controlling combustion within an internal combustion engine having a variety of sensors for monitoring combustion occurring within a cylinder, such that adjustments may be made to operating parameters of the internal combustion engine. The adjustments of the operating parameters allow combustion to function properly, while also allowing emissions of the engine to meet government mandates.

BACKGROUND

Many modern diesel engines have an exhaust system that features an exhaust gas recirculation ("EGR") system that routes a portion of engine exhaust gas into an air intake system, such that a mixture of fresh air and engine exhaust is supplied to a combustion chamber during engine operation. In order to reduce certain pollutants found in exhaust gas of an internal combustion engine, such as NOx and particulate matter, several approaches have been tried, including using an after-treatment chemical in conjunction with a catalytic converter, a system often referred to as a selective catalyst reduction system or an "SCR system." An SCR system adds complexity to an engine, and requires a catalyst that must be periodically replenished, which increases operating costs. If the catalyst is not replenished, the engine exhaust typically will not meet emissions standards, and the engine may be required to cease operations.

Therefore, a need exists for an engine capable of meeting emissions standards without the use of an after-treatment system to control parameters useful in reducing emissions of the engine.

SUMMARY

According to one process, a method of operating an internal combustion engine is provided. An air/fuel ratio of the internal combustion engine is determined. At least one of a fuel injection quantity and an intake air flow is adjusted to provide an air/fuel ratio between about 15 and about 18. A compression ratio within a cylinder of the engine is determined. Droplet size of fuel provided by a fuel injector is adjusted based upon the compression ratio determined within the cylinder of the engine.

According to another process, a method of operating an internal combustion engine is provided. An air/fuel ratio of an internal combustion engine is determined. At least one of a fuel injection quantity and an intake air flow is adjusted to provide an air/fuel ratio between about 15 and about 18. An in-cylinder pressure within a cylinder of the engine is determined. A droplet size of fuel provided by a fuel injector is adjusted based upon the in-cylinder pressure determined within the cylinder of the engine.

BRIEF DESCRIPTION OF THE DRAWINGS

FIG. 1 is a schematic diagram showing an engine;
FIG. 2 is a sectional view of an engine showing a cylinder having an in-cylinder pressure sensor;
FIG. 3 is block diagram showing a control system for an engine having an in-cylinder pressure sensor.

DETAILED DESCRIPTION

Figure 4:
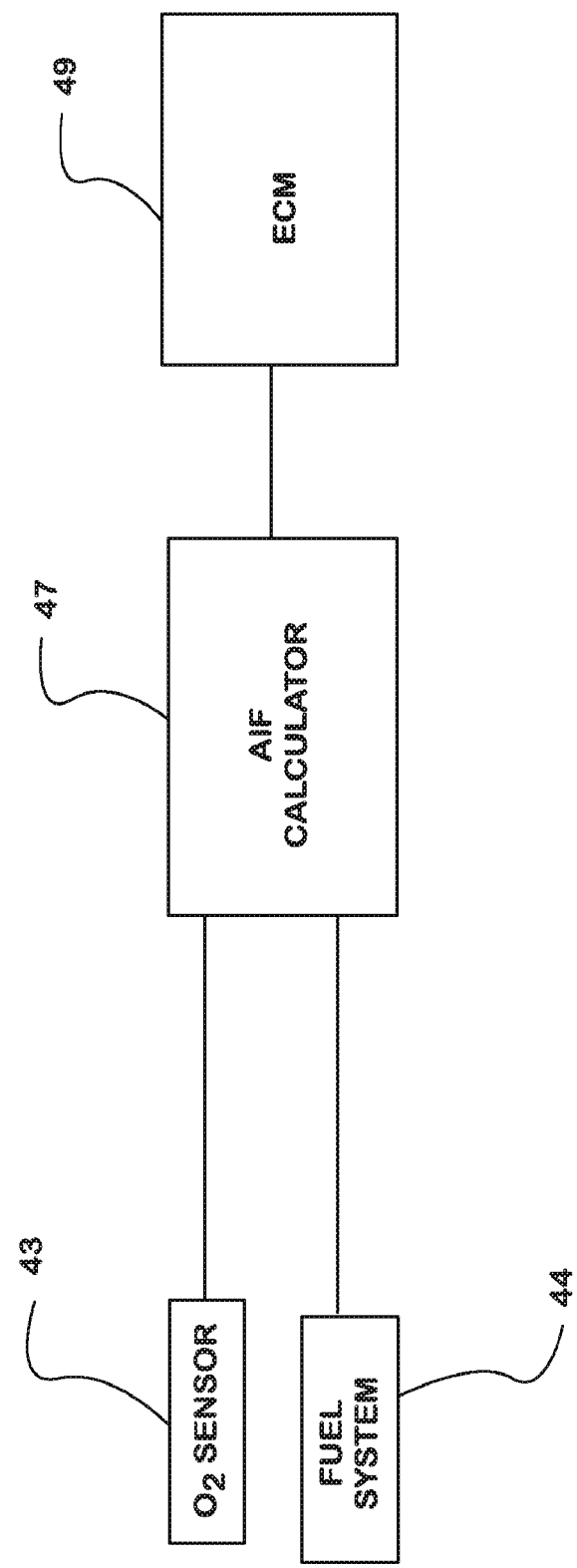
FIG. 4 is a block diagram showing an air/fuel ratio calculator.

FIG. 1 shows an engine 10 having an exhaust system 12. The exhaust system 12 has an exhaust gas recirculation ("EGR") portion 13. The EGR portion 13 has an EGR cooler 14 and an EGR valve 16. The EGR cooler 14 reduces the temperature of exhaust gas within the EGR portion 13. The exhaust system 12 additionally is shown as having a first turbocharger turbine 18 and a second turbocharger turbine 20. The EGR valve 16 controls the flow of exhaust gas within the EGR portion 13.

The engine 10 additionally has an air intake system 22. The air intake system 22 has a first turbocharger compressor 24 and a second turbocharger compressor 26. A charge air cooler 28 is additionally provided to cool intake air within the air intake system 22. A first throttle valve 30 and a second throttle valve 32 are also disposed within the air intake system 22. The first turbocharger turbine 18 and the first turbocharger compressor 24 form a first turbocharger and the second turbocharger turbine 20 and the second turbocharger compressor 26 form a second turbocharger. It is contemplated that the first turbocharger and the second turbocharger may be variable geometry turbochargers.

Turning now to FIG. 2, a cross section of a cylinder 34 of the engine 10. The cylinder 34 has a piston 36 that moves reciprocally within the cylinder 34. A cylinder head 38 is disposed above the cylinder 34, such that the movement of the piston 36 within the cylinder 34 increases a pressure within the cylinder 34. An in-cylinder pressure sensor 40 is additionally provided. The in-cylinder pressure sensor 40 is disposed within the cylinder head 38 and a portion of the in-cylinder pressure sensor 40 is exposed within the cylinder 34. The in-cylinder pressure sensor 40 monitors the pressure within the cylinder 34. In a multi-cylinder engine 10, there are multiple sensors 40 forming a sensor group 41.

FIG. 3 depicts a block diagram for a control system 42 for the engine 10, while FIGS. 6a and 6b depict a flow chart of a method of controlling the engine 10. The control system 42 has a fuel system control component 44 and an air system control component 46. The fuel system control component 44 has an accelerator position sensor 48 and an engine speed sensor 50. The accelerator position sensor 48 and the engine speed sensor 50 are in electrical communication with a fuel system controller 52.

The fuel system controller 52 has a memory that stores fuel injection quantity data 54, fuel injection pressure data 55 as well as fuel injection timing data 56, wherein both data 54, 56 are graphically represented with curves. The fuel injection pressure data 55 is variable, and is dependent at least in part on the in-cylinder pressure data from the group 41 of in-cylinder pressure sensors 40. For instance, the fuel injection pressure data 55 may vary proportionally with the in-cylinder pressure observed by the in-cylinder pressure sensors 40. For instance, as in-cylinder pressure increases, fuel injection pressure may also increase. The increased fuel injection pressure allows fuel injected into the cylinder 34 with a high in-cylinder pressure to penetrate to locations proximate walls of the cylinder 34, thereby utilizing oxygen disposed within areas of the cylinder 34 not previously used for combustion. Similarly, when in-cylinder pressure is low, fuel injection pressure may be lowered to prevent an excess amount of fuel from contacting walls of the cylinder 34

Based upon the input received from the accelerator position sensor 48 and the engine speed sensor 50, the fuel system controller 52 retrieves a fuel injection quantity output from the fuel injection quantity data 54, retrieves a fuel injection pressure output 55, and also retrieves a fuel injection timing output from the fuel injection timing data 56. The fuel injection quantity output is communicated to a fuel injection quantity comparator 58, the fuel injection pressure output is communicated to a fuel injection pressure comparator 59, while the fuel injection timing output is communicated to a fuel injection timing comparator 60.

The fuel system control component 44 additionally utilizes the group 41 of in-cylinder pressure sensors 40 that communicate with a combustion monitoring processor 64 that contains a fuel system memory 66 containing fuel injection timing correction data, fuel injection pressure correction data, and fuel injection quantity correction data based upon the output of the group 41 of in-cylinder pressure sensors 40. Outputs of the fuel system memory 66 is electronically communicated to the fuel injection quantity comparator 58, the fuel injection pressure comparator 59, and the fuel injection timing comparator 60. The fuel injection quantity comparator 58 compares the output of the fuel injection quantity data 54 with the output from the fuel system memory 66 of the combustion monitoring processor 64 to generate a corrected fuel injection quantity communicated to a fuel injector 70. The fuel injection pressure comparator 59 compares the output of the fuel injection pressure data 55 with the output from the fuel system memory 66 of the combustion monitoring processor 64 to generate a corrected fuel injection pressure communicated to a fuel injector 70. Similarly, the fuel injection timing comparator 60 compares the output of the fuel injection timing data 56 with the output from the fuel system memory 66 of the combustion monitoring processor 64 to generate a corrected fuel injection timing communicated to a fuel injector 70.

The air system control component 44 of the control system 42 for the engine 10 additionally utilizes the group 41 of in-cylinder pressure sensors 40 that communicate with the combustion monitoring processor 64 that has an air intake system memory 68. An air intake system controller 72 has a memory that stores turbocharger data 74 as well as EGR system data 76. The air intake system controller 72 retrieves a turbocharger setting from the turbocharger data 74 based upon engine operating conditions. The air intake system controller 72 additionally retrieves an EGR valve setting from the EGR system data 76. Output of the turbocharger data 74 and the air intake system memory 68 is transmitted to a turbocharger comparator 78 which compares the turbocharger data 74 with the output of the air intake system memory 68 and may adjust the turbocharger setting output using the turbocharger data 74 to generate a corrected turbocharger setting to a turbocharger 82.

The EGR system data 76 from the air intake system controller 72 is transmitted to an EGR system comparator 80 where the EGR system comparator 80 compares it to the output of the air intake system memory 68 and may adjust the EGR setting output using the EGR system data 76 to generate a corrected EGR system setting to an EGR valve 84.

Controlling combustion of fuel within the cylinder 34 requires a number of additional sensors. For instance, an oxygen sensor 43 may be provided. As shown in FIG. 1, the oxygen sensor 43 is disposed within the exhaust system 12 of the engine 10. However, it is contemplated that the oxygen sensor 43 may alternatively be placed in the air intake system 22. The oxygen sensor 43 allows a concentration of oxygen within the cylinder 34 during combustion to be calculated. Further, based on a percent of EGR being provided from the EGR portion 13 to the engine 10 for combustion, a total amount of oxygen available for combustion may be determined.

FIG. 4 shows a method of calculating an air/fuel ratio. A fuel system 44 on the engine 10 provides information to an air/fuel ratio calculator 47 regarding an amount of fuel injected into the cylinder 34 during a combustion cycle. The air/fuel ratio calculator 46 also receives an input from the oxygen sensor 43. Thus, based on the output of the oxygen sensor 42 and the fuel system 44, the air/fuel ratio calculator 47 determines the air/fuel ratio of the engine 10. The air/fuel ratio calculator 47 communicates with an electronic control module ECM 49. The ECM 49 has a memory containing prestored data relating to air/fuel ratio for various engine operating conditions, that may be a function of engine speed, engine power output, engine operating state, temperature, altitude, air pressure, and the like.

A variety of approaches may be utilized to adjust fuel injection pressure. For instance, in a common-rail fuel system, a pressure relief valve may be provided at an outlet of the common-rail in order to reduce the pressure of the fuel injection. Similarly, a pressure relief valve may be provided at each injector, or in a fluid line in fluid communication with a fuel injector, so that fuel pressure at the injector is reduced. In a unit injector, a length of travel of a piston may be adjusted to vary the pressure of fuel injected by the injector. Such an variable piston travel may be implemented by a variable profile cam surface. Similarly, a piston-type fuel pump may have a variable cam surface to modify the length of travel of the piston used to pressurize the fuel that is fed to injectors to vary the injection pressure.

Additionally, it is contemplated that adjustments can be made to diameters of flow paths within fuel injectors to modify the pressure of fuel leaving the injector. For instance, the diameter of the flow path may be reduced in order to increase pressure, or the diameter of the flow path may be increased to reduce the pressure of fuel injected into the cylinder.

Further, in addition to adjusting the diameter of the flow path within a fuel injector, it is also contemplated that relief valves may be provided on each injector to reduce the injection pressure below its maximum value. The pressure relief valve could be electronically actuated to allow a portion of the fuel passing through the injector to drain back to a fuel tank of a vehicle.

Balancing the ratio between fuel injection pressure and in-cylinder pressure is beneficial in obtaining atomization of fuel within the cylinder 34. Proper atomization of the fuel allows more of the oxygen available within the cylinder to be utilized, thereby allowing higher rates of EGR to be used during combustion to reduce the formation of $NO_x$ during combustion. Controlling fuel injection pressure also allows more accurate control of the timing of combustion of fuel, allowing the temperature generated by combustion of fuel to be more accurately controlled.

In addition to balancing the fuel injection pressure with the in-cylinder pressure, it is also contemplated that a droplet size of fuel being injected into the cylinder 36 may also be adjusted. Fuel droplet size may be partially controlled based upon injection pressure of the fuel exiting the injector. It is also contemplated that fuel droplet size may be controlled by controlling an aperture of the fuel injector to adjust fuel droplet size. For instance, a larger aperture will generate a larger droplet, while a smaller aperture will result in a smaller droplet. Further, it is contemplated that a fuel injector could have multiple sets of openings, a first set to deliver small fuel droplets and a second set to deliver large fuel droplets. A variety of alternative structures and methods of operation for varying fuel droplet size may be utilized and the invention is not intended to be limited to any particular one of these.

It is contemplated that such a variable fuel droplet size concept would be utilized in connection with an engine operating with an air/fuel ratio between about 15 and about 18. An air/fuel ratio calculator receives an input from the oxygen sensor and a fuel system. Thus, based on the output of the oxygen sensor and the fuel system, the air/fuel ratio calculator determines the air/fuel ratio of the engine 10. The air/fuel ratio calculator communicates with an electronic control module (ECM). The ECM has a memory containing prestored data relating to air/fuel ratio for various engine operating conditions, that may be an function of engine speed, engine power output, engine operating state, temperature, altitude, air pressure, and the like. Based upon the prestored data, at least one of the fuel injection quantity and intake air flow is adjusted to generate an air/fuel ratio within the desired range.

A method of operating an internal combustion engine that adjusts the droplet size of fuel provided by a fuel injector would initially determine an air/fuel ratio as described above. At least one of the fuel injection quantity and intake air flow provided to the engine is adjusted to provide an air/fuel ratio of between about 15 and about 18. The compression ratio of the engine is determined. The droplet size of fuel provided by the fuel injector is adjusted based upon the compression ratio within the engine.

According to another embodiment, a method of operating an internal combustion engine that adjusts the droplet size f fuel provided by a fuel injector would initially determine an air/fuel ratio as described above. At least one of the fuel injection quantity and intake air flow provided to the engine is adjusted to provide an air/fuel ratio of between about 15 and about 18. An in-cylinder pressure within a cylinder of the engine is determined. The droplet size of fuel provided by the fuel injector is adjusted based upon the in-cylinder pressure within the cylinder of the engine.

What is claimed is:

1. A method of operating an internal combustion engine having a plurality of cylinders, comprising:
   providing air and fuel to a cylinder of the engine at an air/fuel ratio between about 15 and about 18;
   determining a compression ratio within the engine cylinder;
   the fuel being supplied by a fuel injector; and
   adjusting the droplet size of the fuel provided by the fuel injector based at least in part upon the compression ratio determined within the cylinder of the engine.

2. A method in accordance with claim 1 in which providing air and fuel to a cylinder of the engine at an air/fuel ratio between about 15 and about 18 comprises adjusting at least one of a fuel injection quantity and an intake air flow.

3. A method in accordance with claim 1 in which the engine has a variable compression ratio.

4. A method of operating an internal combustion engine, comprising:
   determining an air/fuel ratio of an internal combustion engine;
   adjusting at least one of a fuel injection quantity and an intake air flow to provide an air/fuel ratio between about 15 and about 18;
   determining an in-cylinder pressure within a cylinder of the engine;
   adjusting droplet size of fuel provided by a fuel injector based upon the in-cylinder pressure determined within the cylinder of the engine.

* * * * *